US012662563B2

(12) United States Patent
Pearson et al.

(10) Patent No.: US 12,662,563 B2
(45) Date of Patent: Jun. 23, 2026

(54) HYDROCARBYL-MODIFIED METHYLALUMINOXANE COCATALYST FOR CONSTRAINED GEOMETRY PROCATALYSTS

(71) Applicant: Dow Global Technologies LLC, Midland, MI (US)

(72) Inventors: David M. Pearson, Lake Jackson, TX (US); Dharati Joshi Koenigs, Lake Jackson, TX (US); Philip P. Fontaine, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 623 days.

(21) Appl. No.: 18/005,803

(22) PCT Filed: Feb. 5, 2021

(86) PCT No.: PCT/US2021/016775
§ 371 (c)(1),
(2) Date: Jan. 17, 2023

(87) PCT Pub. No.: WO2022/015367
PCT Pub. Date: Jan. 20, 2022

(65) Prior Publication Data

US 2023/0272133 A1 Aug. 31, 2023

Related U.S. Application Data

(60) Provisional application No. 63/053,348, filed on Jul. 17, 2020.

(51) Int. Cl.
*C08F 4/659* (2006.01)
*C08F 2/04* (2006.01)
*C08F 10/02* (2006.01)
*C08F 210/16* (2006.01)
*C08F 4/64* (2006.01)

(52) U.S. Cl.
CPC .............. *C08F 210/16* (2013.01); *C08F 2/04* (2013.01); *C08F 4/65912* (2013.01); *C08F 4/64* (2013.01); *C08F 10/02* (2013.01)

(58) Field of Classification Search
CPC .................................. C08F 4/64; C08F 4/659
See application file for complete search history.

(56) References Cited

U.S. PATENT DOCUMENTS 3,645,992 A 2/1972 Elston
3,914,342 A 10/1975 Mitchell
4,076,698 A 2/1978 Anderson et al.
5,064,802 A 11/1991 Stevens et al.
5,066,631 A 11/1991 Sangokoya et al.
5,153,157 A 10/1992 Hlatky et al.
5,235,081 A * 8/1993 Sangokoya ............. C07F 5/068 556/179
5,272,236 A 12/1993 Lai et al.
5,278,272 A 1/1994 Lai et al.
5,321,106 A 6/1994 LaPointe
5,350,723 A 9/1994 Neithamer et al.
5,425,872 A 6/1995 Devore et al.
5,470,993 A 11/1995 Devore et al.
5,559,199 A * 9/1996 Abe ...................... C08F 210/02 526/170
5,565,395 A * 10/1996 Sangokoya .......... B01J 31/2295 502/103
5,582,923 A 12/1996 Kale et al.
5,625,087 A 4/1997 Devore et al.
(Continued)

FOREIGN PATENT DOCUMENTS

CN 101001885 A 7/2007
CN 102906129 A 1/2013
(Continued)

OTHER PUBLICATIONS

Chinese Office Action dated Apr. 23, 2025, pertaining to CN Patent Application No. 202180060770.3, 12 pgs.
Chinese Office Action dated Apr. 10, 2024, pertaining to CN Patent Application No. 2021800607703, 14 pgs.
Tritto et al. "Low-temperature 1H and 13C NMR investigation of trimethylaluminium contained in methylaluminoxane cocatalyst for metallocene-based catalysts in olefin polymerization", Macromol. Chem. Phys. 1996, 197, 1537.
Abdulaal et al. Joint Effect of Poly(ethyhlene-co-1-octene) Chain Length and 1-Octene Fraction on High-Temperature Thermal Gradient Interation Chromatography, Macromolecular Chem Phy, 2017, 218, 1600332.

(Continued)

*Primary Examiner* — Rip A Lee
(74) *Attorney, Agent, or Firm* — Dinsmore & Shohl LLP

(57) ABSTRACT

Processes of polymerizing olefin monomers. The process includes reacting ethylene and optionally one or more olefin monomers in the presence of a catalyst system, wherein the catalyst system comprises: hydrocarbyl-modified methylaluminoxane having less than 25 mole percent trihydrocarbyl aluminum compounds $AlR^{A1}R^{B1}R^{C1}$ based on the total moles of aluminum, where $R^{A1}$, $R^{B1}$, and $R^{C1}$ are independently linear ($C_1$-$C_{40}$)alkyl, branched ($C_1$-$C_{40}$)alkyl, or ($C_6$-$C_{40}$)aryl; and one or more procatalysts comprising a metal-ligand complex according to formula (I): (Formula (I)).

(I)

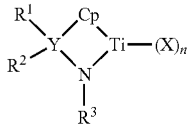

19 Claims, No Drawings

(56) References Cited

U.S. PATENT DOCUMENTS

| | | | | |
|---|---|---|---|---|
| 5,721,185 | A | 2/1998 | LaPointe et al. | |
| 5,728,855 | A | 3/1998 | Smith et al. | |
| 5,777,143 | A | 7/1998 | Malpass et al. | |
| 5,783,512 | A | 7/1998 | Jacobsen et al. | |
| 5,854,045 | A | 12/1998 | Fang et al. | |
| 5,883,204 | A | 3/1999 | Spencer et al. | |
| 5,919,983 | A | 7/1999 | Rosen et al. | |
| 5,965,756 | A | 10/1999 | McAdon et al. | |
| 6,103,657 | A | 8/2000 | Murray | |
| 6,207,775 | B1 * | 3/2001 | Marti | C08F 210/00 526/133 |
| 6,268,444 | B1 | 7/2001 | Klosin et al. | |
| 6,320,005 | B1 | 11/2001 | Murray | |
| 6,518,445 | B1 * | 2/2003 | Brantley | C08F 10/00 502/103 |
| 6,884,857 | B1 | 4/2005 | Stevens et al. | |
| 8,202,953 | B2 | 6/2012 | Konze et al. | |
| 8,318,896 | B2 | 11/2012 | Winniford et al. | |
| 8,354,484 | B2 | 1/2013 | Konze et al. | |
| 8,476,076 | B2 | 7/2013 | Van Damme et al. | |
| 9,527,941 | B2 | 12/2016 | Demirors et al. | |
| 9,631,059 | B2 | 4/2017 | Demirors et al. | |
| 9,688,795 | B2 | 6/2017 | Cerk et al. | |
| 2002/0198395 | A1 * | 12/2002 | Brantley | C07F 5/068 556/182 |
| 2004/0010103 | A1 | 1/2004 | Boussie et al. | |
| 2004/0220050 | A1 | 11/2004 | Frazier et al. | |
| 2009/0299116 | A1 | 12/2009 | Konze et al. | |
| 2013/0059991 | A1 | 3/2013 | Ishii et al. | |
| 2016/0108185 | A1 | 4/2016 | Wang et al. | |
| 2016/0229964 | A1 | 8/2016 | Bellehumeur et al. | |
| 2017/0137550 | A1 | 5/2017 | Ewart et al. | |
| 2018/0155474 | A1 | 6/2018 | Holtcamp et al. | |
| 2019/0241687 | A1 | 8/2019 | Chen et al. | |

FOREIGN PATENT DOCUMENTS

| | | | | |
|---|---|---|---|---|
| CN | 105713278 | B | 2/2018 | |
| CN | 108059763 | A | 5/2018 | |
| CN | 111133010 | A | 5/2020 | |
| CN | 111164110 | A | 5/2020 | |
| EP | 1935909 | A1 | 6/2008 | |
| EP | 2177548 | A1 | 4/2010 | |
| EP | 2348057 | A1 | 7/2011 | |
| EP | 2567987 | A1 | 3/2013 | |
| EP | 2714226 | B1 | 4/2016 | |
| EP | 3772415 | A1 | 2/2021 | |
| JP | 2000072811 | A * | 3/2000 | C08F 4/642 |
| JP | 2004182963 | A | 7/2004 | |
| JP | 2013534934 | A | 9/2013 | |
| JP | 2018080234 | A | 5/2018 | |
| WO | 1999015534 | A1 | 4/1999 | |
| WO | 1999042467 | A1 | 8/1999 | |
| WO | 2001042315 | A1 | 6/2001 | |
| WO | 2002038628 | A2 | 5/2002 | |
| WO | 2003040195 | A1 | 5/2003 | |
| WO | 2007045415 | A1 | 4/2007 | |
| WO | 2007136494 | A2 | 11/2007 | |
| WO | 2009029857 | A1 | 3/2009 | |
| WO | 2010034463 | A1 | 4/2010 | |
| WO | 2012027448 | A1 | 3/2012 | |
| WO | WO-2012096698 | A2 * | 7/2012 | C08F 210/16 |
| WO | 2013023174 | A1 | 2/2013 | |
| WO | 2013087531 | A1 | 6/2013 | |
| WO | 2015200743 | A1 | 12/2015 | |
| WO | 2016003878 | A1 | 1/2016 | |
| WO | 2016014749 | A1 | 1/2016 | |
| WO | 2017040127 | A1 | 3/2017 | |
| WO | 2017058981 | A1 | 4/2017 | |
| WO | 2017004462 | A1 | 5/2017 | |
| WO | 2018002196 | A1 | 1/2018 | |
| WO | 2018022975 | A1 | 2/2018 | |
| WO | 2018183056 | A1 | 10/2018 | |
| WO | 2019067274 | A1 | 4/2019 | |
| WO | 2019070440 | A1 | 4/2019 | |
| WO | 2019191068 | A1 | 10/2019 | |
| WO | 2020047384 | A1 | 3/2020 | |
| WO | 2020139993 | A1 | 7/2020 | |

OTHER PUBLICATIONS

Jordon "Visual Titrimetric Determination of Total Reactivity and Differentiation of Trialkylaluminum and Dialkylaluminum Hydride in Mixtures", Analytical Chemistry 1968, 40 (14), 2150-2153.

Thailand Office Action dated Oct. 8, 2024, pertaining to TH Patent Application No. 2301000252, 8 pgs.

Communication pursuant to Article 94(3) EPC dated Oct. 8, 2024, pertaining to EP Patent Application No. 21710099.9, 5 pgs.

Communication pursuant to Article 94(3) EPC dated Oct. 8, 2024, pertaining to EP Patent Application No. 21708873.1, 5 pgs.

Communication pursuant to Article 94(3) EPC dated Oct. 8, 2024, pertaining to EP Patent Application No. 21709542.1, 6 pgs.

Communication pursuant to Article 94(3) EPC dated Oct. 8, 2024, pertaining to EP Patent Application No. 21709541.3, 4 pgs.

Thailand Office Action dated Oct. 28, 2024, pertaining to TH Patent Application No. 2301000143, 12 pgs.

Thailand Office Action dated Oct. 29, 2024, pertaining to TH Patent Application No. 2301000144, 10 pgs.

Thailand Office Action dated Oct. 28, 2024, pertaining to TH Patent Application No. 2301000253, 12 pgs.

US Non-Final Office Action dated Jul. 9, 2025, pertaining to U.S. Appl. No. 18/005,754, 14 pgs.

Bashir et al., Journal of Applied Polymer Science (2018), DOI: 10, 1002/app. 45670, 9 pp.

US Non-Final Office Action dated Jul. 11, 2025, pertaining to U.S. Appl. No. 18/005,750, 24 pgs.

Chinese Notice of Final Rejection dated Jul. 18, 2025, pertaining to CN Patent Application No. 2021800607703, 20 pgs.

Chinese Office Action dated Jul. 22, 2025, pertaining to CN Patent Application No. 202180060263.X, 6 pgs.

US Non-Final Office Action dated Jul. 29, 2025, pertaining to U.S. Appl. No. 18/005,759, 11 pgs.

Romano et al., Aluminoxane co-catalysts for the activation of a bis phenoxyimine titanium (IV) catalyst in the synthesis of disentangled ultra-high molecular weight polyethylene. Polymer 74 (2015), 76-85 (Year: 2015).

Japanese Office Action dated Aug. 5, 2025, pertaining to JP Patent Application No. 2023-501652, 6 pgs.

Japanese Office Action dated Feb. 4, 2025, pertaining to JP Patent Application No. 2023-503046, 9 pgs.

Japanese Office Action dated Feb. 4, 2025, pertaining to JP Patent Application No. 2023-501555, 10 pgs.

Japanese Office Action dated Feb. 4, 2025, pertaining to JP Patent Application No. 2023-502989, 10 pgs.

Japanese Office Action dated Mar. 11, 2025, pertaining to JP Patent Application No. 2023-501652, 6 pgs.

Chinese Office Action dated Mar. 13, 2025, pertaining to CN Patent Application No. 202180060836.9, 18 pgs.

Chinese Office Action dated Mar. 12, 2025, pertaining to CN Patent Application No. 202180061141.2, 14 pgs.

International Search Report and Written Opinion dated Apr. 30, 2021, pertaining to Int'l Patent Application No. PCT/US2021/016838, 13 pgs.

International Search Report and Written Opinion dated Aug. 11, 2022, pertaining to Int'l Patent Application No. PCT/US2022/012248, 12 pgs.

Karajala et al. "Detection of low levels of long-chain branching in polyolefins", Annual Technical Conference—Society of Plastics Engineers (2008), 66th 887-891.

Chinese Office Action dated Dec. 12, 2024, pertaining to CN Patent Application No. 202180060263.X, 10 pgs.

Chinese Office Action dated Dec. 18, 2024, pertaining to CN Patent Application No. 202180060770.3, 16 pgs.

Brazil Technical Report dated Aug. 19, 2024, pertaining to BR Patent Application No. BR112023000737-2, 10 pgs.

(56) References Cited

OTHER PUBLICATIONS

Brazil Technical Report dated Aug. 28, 2024, pertaining to BR Patent Application No. BR112023000754-2, 10 pgs.
Brazil Technical Report dated Aug. 16, 2024, pertaining to BR Patent Application No. BR112022020685-2, 8 pgs.
Brazil Technical Report dated Aug. 28, 2024, pertaining to BR Patent Application No. BR112023000641-4, 10 pgs.
Bryliakov et al. "Activation of rac-Me2Si(ind)2ZrCI2 by Methylalumoxane Modified by Aluminum Alkyls: An EPR Spin-Probe, IH NMR, and Polymerization Study", Macromol. Chem. Phys., vol. 207, pp. 327-335 (2006).
Busico et al. "Hafnocense and MAO: Beware of Trimethylaluminum!", Macromolecules, vol. 42, pp. 1789-1791 (2009).
Cong et al."A New Technique for Characterizing Comonomer Distribution in Polyolefins: High-Temperature Thermal Gradient Interaction Chromatography (HT-TGIC)", Macromolecules, vol. 44, Issue 8, pp. 3062-3072 (2011).
Ghiotto et al. "Probing the Structure of Methylalumoxane (MAO) by a Combined Chemical, Spectroscopic, Neutron Scattering, and Computational Approach", Organometallics, vol. 32, Issue 11, pp. 3354-3362 (2013).
Pangborn et al. "Safe and Convenient Procedure for Solvent Purification", Organometallics, vol. 15, Issue 5, pp. 1518-1520 (1996).
Striegel et al. "Modern Size-Exclusion Liquid Chromatography", Wiley, 2nd edition, Chapter 3 (2009).
Williams et al. "The Construction of Polyethylene Calibration Curve for Gel Permeation Chromatography Using Polystyrene Fractions", J. Polym. Sci., Polym. Let., vol. 6, p. 621 (1968).
Zhu et al. "Sythesis and Characterization of Branched Polyethylene by Ethylene Homopolymerization with Monotitanocene and Modified Methylaluminoxane Catlaysts", Macromolecules, American Chemical Society, Washington DC United States, vol. 33, No. 14, pp. 5006-5010 (Jul. 11, 2000).
International Search Report and Written Opinion dated Jun. 29, 2021, pertaining to Interntional Patent Application No. PCT/US2021/016789, 15 pgs.
International Search Report and Written Opinion dated May 21, 2021, pertaining to International Patent Application No. PCT/US2021/016814, 15 pgs.
International Search Report and Written Opinion dated Jun. 4, 2021, pertaining to International Patent Application No. PCT/US2021/016820, 15 pgs.
International Search Report and Written Opinion dated Jun. 4, 2021, pertaining to International Patent Application No. PCT/US2021/016775, 16 pgs.
Chinese Second Office Action dated Sep. 30, 2025, pertaining to CN Patent Application No. 202180060836.9, 22 pgs.
US Final Office Action dated Nov. 5, 2025, pertaining to U.S. Appl. No. 18/005,750, 12 pgs.
US Final Office Action dated Nov. 21, 2025, pertaining to U.S. Appl. No. 18/005,759, 6 pgs.
US Notice of Allowance dated Dec. 9, 2025, pertaining to U.S. Appl. No. 18/005,754, 9 pgs.
Japanese Office Action dated Dec. 15, 2025, pertaining to JP Patent Application No. 2024-541048, 8 pgs.
Korean Office Action dated Dec. 18, 2025, pertaining to KR Patent Application No. 10-2023-7005190, 9 pgs.
Korean Office Action dated Dec. 9, 2025, pertaining to KR Patent Application No. 10-2023-7005191, 19 pgs.
Korean Office Action dated Dec. 16, 2025, pertaining to KR Patent Application No. 10-2023-7005189, 11 pgs.
Brazilian Technical Report dated Nov. 21, 2025, pertaining to BR Patent Application No. BR112024013602.7, 8 pgs.
Korean Office Action dated Dec. 15, 2025, pertaining to KR Patent Application No. 10-2023-7004553, 8 pgs.
Japanese Office Action dated Dec. 17, 2025, pertaining to JP Patent Application No. 2023-501652, 6 pgs.
Chinese Office Action dated Jan. 12, 2026, pertaining to CN Patent Application No. 202180061141.2, 8 pgs.
Communication pursuant to Article 94(3) EPC dated Mar. 3, 2026, pertaining to EP Patent Application No. 21709541.3, 4 pgs.
Chinese Office Action dated Mar. 21, 2026, pertaining to CN Patent Application No. 202180060836.9, 20 pgs.
Communication pursuant to Article 94(3) EPC dated Mar. 17, 2026, pertaining to EP Patent Application No. 21709542.1, 4 pgs.
Communication pursuant to Article 94(3) EPC dated Mar. 17, 2026, pertaining to EP Patent Application No. 21710099.9, 4 pgs.

* cited by examiner

HYDROCARBYL-MODIFIED METHYLALUMINOXANE COCATALYST FOR CONSTRAINED GEOMETRY PROCATALYSTS

CROSS REFERENCE TO RELATED APPLICATIONS

This application claims priority to U.S. Provisional Patent Application No. 63/053,348, filed on Jul. 17, 2020, and International Patent Application No. PCT/US2021/016775, filed on Feb. 5, 2021, the entireties of both which are hereby incorporated by reference.

TECHNICAL FIELD

Embodiments of the present disclosure generally relate to hydrocarbyl-modified methylaluminoxane activators for catalysts systems including constrain geometry catalysts (CGC).

BACKGROUND

Olefin based polymers such as polyethylene are produced via various catalyst systems and polymerization processes. Selection of such catalyst systems used in the polymerization process of the olefin based polymers is an important factor contributing to the characteristics and properties of such olefin based polymers.

The polyolefin polymerization process can be varied in a number of ways to produce a wide variety of resultant polyolefin resins having different physical properties suitable for use in different applications. It is generally known that polyolefin can be produced in a solution phase polymerization process, gas phase polymerization process, and/or slurry phase polymerization process in one or more reactors, for example, connected in series or parallel, in the presence of one or more catalyst systems. The use of activating agents in polyolefin polymerization process to activate the precatalyst composition is generally known.

While methylaluminoxanes (MAOs) work well to activate constrained geometry catalysts (CGC) catalysts, MAOs are typically incompatible with solution processes, owing to their limited solubility in hydrocarbon solvents. To increase solubility the MAO is modified with a longer alkyl chain creating a modified methylaluminoxane (MMAO) that has a mixture of both methyl and longer alkyl groups present within the structure. Both the amount of modifier and the amount of trialkylaluminum ($AlR_3$) are important to maintain solubility and stability of the MMAO in hydrocarbon solvents.

As part of the catalyst composition in $\alpha$-olefin polymerization reactions, the activator may have characteristics that are beneficial for the production of the $\alpha$-olefin polymer and for final polymer compositions including the $\alpha$-olefin polymer. Activator characteristics that increase the production of $\alpha$-olefin polymers include, but are not limited to: rapid procatalyst activation, high catalyst efficiency, high temperature capability, consistent polymer composition, and selective deactivation.

Borate based co-catalysts in particular have contributed significantly to the fundamental understanding of olefin polymerization mechanisms, and have enhanced the ability for precise control over polyolefin microstructures by deliberately tuning catalyst structures and processes. This results in stimulated interest in mechanistic studies and lead to the development of novel homogeneous olefin polymerization catalyst systems that have precise control over polyolefin microstructures and performance. However, once the cations of the activator or co-catalyst activate the procatalyst, the ions of the activator may remain in the polymer composition. As a result, the borate anions may affect the polymer composition. In particular, the size of the borate anion, the charge of the borate anion, the interaction of the borate anion with the surrounding medium, and the dissociation energy of the borate anion with available counterions will affect the ion's ability to diffuse through a surrounding medium such as a solvent, a gel, or a polymer material.

Modified methylaluminoxanes (MMAO) are used as activators in some PE processes. However, MMAO has been found to have negative impact on the performance of some catalysts, such as CGC catalysts and negatively impacted the production of polyolefin or polyvinyl resins. The negative impact on the polymerization process includes decreasing catalyst activity, broadening composition distribution of the produced polymer, and negatively affecting the pellet handling.

SUMMARY

There is an ongoing need to create a catalyst system while maintaining catalyst efficiency, reactivity, and the ability to produce polymers with good physical properties.

Embodiments of this disclosure includes processes of polymerizing olefin monomers. In one or more embodiments, the process includes reacting ethylene and optionally one or more olefin monomers in the presence of a catalyst system. The catalyst system includes hydrocarbyl-modified methylaluminoxane and a procatalyst. The hydrocarbyl-modified methylaluminoxane having less than 25 mole percent trihydrocarbyl aluminum compounds $AlR^{A1}R^{B1}R^{C1}$, based on the total moles of aluminum, where $R^{A1}$, $R^{B1}$, and $R^{C1}$ are independently linear $(C_1\text{-}C_{40})$alkyl, branched $(C_1\text{-}C_{40})$alkyl, or $(C_6\text{-}C_{40})$aryl; and one or more procatalysts comprising a metal-ligand complex according to formula (I):

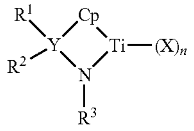

(I)

In formula (I), Ti is titanium. Subscript n of $(X)_n$ is 1, 2, or 3. Each X is a monodentate ligand or bidentate ligand independently chosen from unsaturated $(C_2\text{-}C_{50})$hydrocarbon, unsaturated $(C_2\text{-}C_{50})$heterohydrocarbon, saturated $(C_2\text{-}C_{50})$heterohydrocarbon, $(C_1\text{-}C_{50})$hydrocarbyl, $(C_6\text{-}C_{50})$aryl, $(C_6\text{-}C_{50})$heteroaryl, cyclopentadienyl, substituted cyclopentadienyl, $(C_4\text{-}C_{12})$diene, halogen, $-N(R^N)_2$, and $-NCOR^C$. The metal-ligand complex is overall charge-neutral.

In formula (I), Cp is selected from the group consisting of cyclopentadienyl and $R^S$ substituted cyclopentadienyl, the Cp being bound in an $\eta^5$ bonding mode to Ti, wherein $R^S$ is independently selected from the group consisting of $(C_1\text{-}C_{20})$alkyl, $(C_1\text{-}C_{20})$heteroalkyl, $(C_1\text{-}C_{20})$aryl, or $R^S$ substituent $(C_1\text{-}C_{20})$aryl, $(C_1\text{-}C_{20})$heteroaryl, or $R^S$ substituent $(C_1\text{-}C_{20})$heteroaryl, wherein two adjacent $R^S$ groups are optionally linked to form a ring.

In formula (I), N is nitrogen; Y is carbon or silicon; wherein Y is covalently bonded to Cp; and $R^1$ and $R^2$ are independently selected from —H, $(C_1\text{-}C_{40})$hydrocarbyl, and $(C_1-C_{40})$heterohydrocarbyl; and $R^3$ are independently selected from $(C_1-C_{40})$hydrocarbyl, and $(C_1-C_{40})$heterohydrocarbyl.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf: trifluoromethane sulfonate; THF: tetrahydrofuran; $Et_2O$: diethyl ether; $CH_2Cl_2$: dichloromethane; CV: column volume (used in column chromatography); EtOAc: ethyl acetate; $C_6D_6$: deuterated benzene or benzene-d6 $CDCl_3$: deuterated chloroform; $Na_2SO_4$: sodium sulfate; $MgSO_4$: magnesium sulfate; HCl hydrogen chloride; n-BuLi: butyllithium; t-BuLi: tert-butyllithium; MAO: methylaluminoxane; MMAO: modified methylaluminoxane; GC: gas chromatography; LC liquid chromatography; NMR: nuclear magnetic resonance; MS: mass spectrometry; mmol millimoles; mL: milliliters; M: molar; min or mins: minutes; h or hrs: hours; d: days.

The term "independently selected" is used herein to indicate that the R groups, such as, $R^1$, $R^2$, $R^3$, $R^4$, and $R^5$, can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc). A chemical name associated with an R group is intended to convey the chemical structure that is recognized in the art as corresponding to that of the chemical name. Thus, chemical names are intended to supplement and illustrate, not preclude, the structural definitions known to those of skill in the art.

The term "procatalyst" refers to a transition metal compound that has olefin polymerization catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$. An $R^S$ substituted chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl ($-C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom of a corresponding unsubstituted compound or functional group is replaced by a substituent (e.g. $R^S$). The term "—H" means a hydrogen or hydrogen radical that is covalently bonded to another atom. "Hydrogen" and "—H" are interchangeable, and unless clearly specified have identical meanings.

The term "$(C_1-C_{50})$alkyl" means a saturated straight or branched hydrocarbon radical containing from 1 to 50 carbon atoms; and the term "$(C_1-C_{30})$alkyl" means a saturated straight or branched hydrocarbon radical of from 1 to 30 carbon atoms. Each $(C_1-C_{50})$alkyl and $(C_1-C_{30})$alkyl may be unsubstituted or substituted by one or more $R^S$. In some examples, each hydrogen atom in a hydrocarbon radical may be substituted with $R^S$, such as, for example trifluoromethyl. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, such as, for example, methyl, trifluoromethyl, ethyl, 1-propyl, 1-methylethyl, or 1,1-dimethylethyl.

The term $(C_3-C_{50})$alkenyl means a branched or unbranched, cyclic or acyclic monovalent hydrocarbon radical containing from 3 to 50 carbon atoms, at least one double bond and is unsubstituted or substituted by one or more $R^S$. Examples of unsubstituted $(C_3-C_{50})$alkenyl: n-propenyl, isopropenyl, n-butenyl, isobutenyl, octenyl, decenyl, cyclopentenyl, cyclopentadienyl, cyclohexenyl, and cyclohexadienyl. Examples of substituted $(C_3-C_{50})$alkenyl: (2-trifluoromethyl)pent-1-enyl, (3-methyl)hex-1-eneyl, (3-methyl)hexa-1,4-dienyl and (Z)-1-(6-methylhept-3-en-1-yl)cyclohex-1-eneyl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, and 1-fluorocyclohexyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double or triple bonds optionally may be present in substituents $R^S$. The term "unsaturated" means containing one or more carbon-carbon double bonds or carbon-carbon triple bonds, or (in heteroatom-containing groups) one or more carbon-nitrogen double bonds, carbon-phosphorous double bonds, or carbon-silicon double bonds, not including double bonds that may be present in substituents $R^S$, if any, or in aromatic rings or heteroaromatic rings, if any.

The term "hydrocarbyl-modified methylaluminoxane" refers to a methylaluminoxane (MAO) structure comprising an amount of trihydrocarbyl aluminum. The hydrocarbyl-modified methylaluminoxane includes a combination of a hydrocarbyl-modified methylaluminoxane matrix and trihydrocarbylaluminum. A total molar amount of aluminum in the hydrocarbyl-modified methylaluminoxane is composed of the aluminum contribution from the moles of aluminum from the hydrocarbyl-modified methylaluminoxane matrix and moles of aluminum from the trihydrocarbyl aluminum. The hydrocarbyl-modified methylaluminoxane includes greater than 2.5 mole percent of trihydrocarbylaluminum based on the total moles of aluminum in the hydrocarbyl-modified methylaluminoxane. These additional hydrocarbyl substituents can impact the subsequent aluminoxane structure and result in differences in the distribution and size of aluminoxane clusters (Bryliakov, K. P et. al. *Macromol. Chem. Phys.* 2006, 207, 327-335). The additional hydrocarbyl substituents can also impart increased solubility of the aluminoxane in hydrocarbon solvents such as, but not limited to, hexane, heptane, methylcyclohexane, and ISOPAR E™ as demonstrated in U.S. Pat. No. 5,777,143. Modified methylaluminoxane compositions are generically disclosed and can be prepared as described in U.S. Pat. Nos. 5,066,631 and 5,728,855, both of which are incorporated herein by reference.

Modified methylaluminoxanes (MMAOs) can be described as a mixture of aluminoxane structures and trihydrocarbylaluminum species. Trihydrocarbylaluminum species, like trimethyl aluminum are used as scavengers to remove impurities in the polymerization process which may contribute to the deactivation of the olefin polymerization catalyst. However, it is believed that trihydrocarbylaluminum species may be active in some polymerization systems. Catalyst inhibition has been noted when trimethylaluminum is present in propylene homopolymerizations with hafnocene catalysts at 60° C. (Busico, V. et. al. *Macromolecules* 2009, 42, 1789-1791). However, these observations convolute differences in MAO-activation versus borate activation, and even in direct comparison only possibly capture differences between some trimethylaluminum and none. Additionally it is unclear that such observations extend to other catalysts systems, to ethylene polymerization, or to polymerizations conducted at higher temperatures. Regardless, the preference for soluble MAOs necessitates the use of MMAO and hence the presence of trihydrocarbylaluminum species.

In one or more embodiments, the process includes reacting ethylene and optionally one or more olefin monomers in the presence of a catalyst system. The catalyst system includes hydrocarbyl-modified methylaluminoxane and a procatalyst. The hydrocarbyl-modified methylaluminoxane having less than 25 mole percent trihydrocarbyl aluminum compounds $AlR^{A1}R^{B1}R^{C1}$ based on the total moles of aluminum, where $R^{A1}$, $R^{B1}$, and $R^{C1}$ are independently linear $(C_1\text{-}C_{40})$alkyl, branched $(C_1\text{-}C_{40})$alkyl, or $(C_6\text{-}C_{40})$aryl; and one or more procatalysts comprising a metal-ligand complex according to formula (I):

(I)

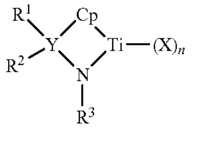

In formula (I), Ti is titanium having a formal oxidation state of +2, +3, or +4. Subscript n of (X)~ is 1, 2, or 3. Each X is a monodentate ligand or bidentate ligand independently chosen from unsaturated $(C_2\text{-}C_{50})$hydrocarbon, unsaturated $(C_2\text{-}C_{50})$heterohydrocarbon, saturated $(C_2\text{-}C_{50})$heterohydrocarbon, $(C_1\text{-}C_{50})$hydrocarbyl, $(C_6\text{-}C_{50})$aryl, $(C_6\text{-}C_{50})$heteroaryl, cyclopentadienyl, substituted cyclopentadienyl, $(C_4\text{-}C_{12})$diene, halogen, —$N(R^N)_2$, and —$NCOR^C$. The metal-ligand complex is overall charge-neutral.

In formula (I), Cp is selected from the group consisting of cyclopentadienyl and $R^S$ substituted cyclopentadienyl, the Cp being bound in an η5 bonding mode to Ti, wherein $R^S$ is independently selected from the group consisting of $(C_1\text{-}C_{20})$alkyl, $(C_1\text{-}C_{20})$heteroalkyl, $(C_1\text{-}C_{20})$aryl, or $R^S$ substituent $(C_1\text{-}C_{20})$aryl, $(C_1\text{-}C_{20})$heteroaryl, or $R^S$ substituent $(C_1\text{-}C_{20})$heteroaryl, wherein two adjacent $R^S$ groups are optionally linked to form a ring.

In formula (I), N is nitrogen; Y is carbon or silicon; wherein Y is covalently bonded to Cp; and $R^1$ and $R^2$ are independently selected from —H, $(C_1\text{-}C_{40})$hydrocarbyl, and $(C_1\text{-}C_{40})$heterohydrocarbyl; and $R^3$ are independently selected from $(C_1\text{-}C_{40})$hydrocarbyl, and $(C_1\text{-}C_{40})$heterohydrocarbyl.

Embodiments of this disclosure includes processes of polymerizing olefin monomers. In one or more embodiments, the process includes reacting ethylene and optionally one or more olefin monomers in the presence of a catalyst system.

In some embodiments, the olefin monomer is $(C_3\text{-}C_{20})\alpha$-olefin. In other embodiments, the olefin monomer is not $(C_3\text{-}C_{20})\alpha$-olefin. In various embodiments, the olefin monomer is cyclic olefin.

In various embodiment, the polymerization process of the present disclosure does not include a borate activator.

In embodiments, the hydrocarbyl-modified methylaluminoxane in the polymerization process has less than 20 mole percent of trihydrocarbyl aluminum based on the total moles of aluminum. In some embodiments, the hydrocarbyl-modified methylaluminoxane has less than 15 mole percent of trihydrocarbyl aluminum based on the total mole of hydrocarbyl-modified methylaluminoxane. In one or more embodiments, the hydrocarbyl-modified methylaluminoxane has less than 10 mole percent of trihydrocarbyl aluminum based on the total mole of hydrocarbyl-modified methylaluminoxane. In various embodiments, the hydrocarbyl-modified methylaluminoxane is modified methylaluminoxane.

In some embodiments, the trihydrocarbyl aluminum has a formula of $AlR^{A1}R^{B1}R^{C1}$ where $R^{A1}$, $R^{B1}$, and $R^{C1}$ are independently linear $(C_1\text{-}C_{20})$alkyl, linear $(C_1\text{-}C_{15})$alkyl, or linear $(C_1\text{-}C_{12})$alkyl. In one or more embodiments, $R^{A1}$, $R^{B1}$, and $R^{C1}$ are independently methyl, ethyl, propyl, 2-propyl, butyl, n-octyl, nonyl, decyl, undecyl, or dodecyl. In some embodiment, $R^{A1}$, $R^{B1}$, and $R^{C1}$ are the same. In other embodiments, at least one of $R^{A1}$, $R^{B1}$, and $R^{C1}$ is different from the other $R^{A1}$, $R^{B1}$, and $R^{C1}$.

In one or more embodiments, $R^1$ and $R^2$ are independently $(C_1\text{-}C_{12})$alkyl or $(C_6\text{-}C_{20})$aryl. In some embodiments, $R^1$ and $R^2$ are methyl, ethyl, propyl, or phenyl.

In various embodiments, $R^3$ is independently $(C_1\text{-}C_{12})$alkyl. In some embodiments, $R^3$ is independently tert-butyl, tert-octyl, or n-octyl.

In some embodiments, Cp is tetramethylcyclopentadienyl.

In one or more embodiments, Cp is selected from:

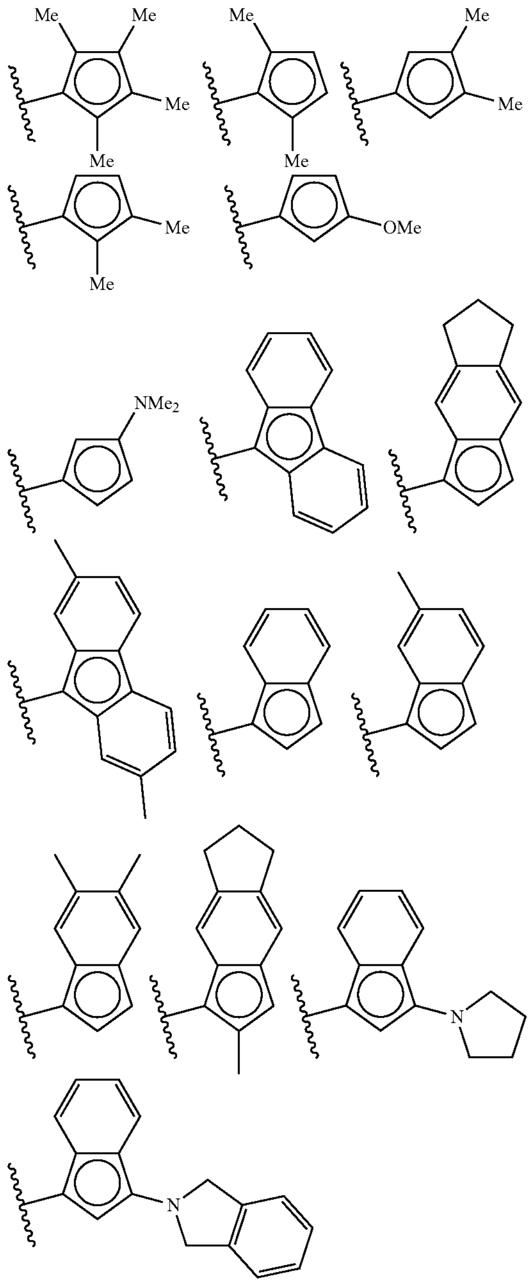

In some embodiments, any or all of the chemical groups (e.g., X and $R^{1-3}$) of the metal-ligand complex of formula (I) may be unsubstituted. In other embodiments, none, any, or all of the chemical groups X and $R^{1-3}$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X and $R^{1-3}$ may be persubstituted with $R^S$. In the chemical groups that are persubstituted with $R^S$, the individual $R^S$ may all be the same or may be independently chosen. In one or more embodiments, $R^S$ is chosen from ($C_1$-$C_{20}$)hydrocarbyl, ($C_1$-$C_2$M)alkyl, ($C_1$-$C_{20}$)heterohydrocarbyl, or ($C_1$-$C_{20}$)heteroalkyl.

Examples of such ($C_1$-$C_{12}$)alkyl include, but are not limited to methyl, ethyl, 1-propyl, 2-propyl (also called iso-propyl), 1,1-dimethylethyl, cyclopentyl, or cyclohexyl, butyl, tert-butyl, pentyl, hexyl, heptyl, n-octyl, tert-octyl (also called 2,4,4-trimethylpent-2-yl), nonyl, decyl, undecyl, and dodecyl.

In the metal-ligand complex according to formula (I), X bonds with Ti through a covalent bond or an ionic bond. In some embodiments, X may be a monoanionic ligand having a net formal oxidation state of −1. Each monoanionic ligand may independently be hydride, ($C_1$-$C_{40}$)hydrocarbyl carbanion, ($C_1$-$C_{40}$)heterohydrocarbyl carbanion, halide, nitrate, carbonate, phosphate, sulfate, $HC(O)O^-$, $HC(O)N(H)^-$, ($C_1$-$C_{40}$)hydrocarbylC(O)$O^-$, ($C_1$-$C_{40}$)hydrocarbylC(O)N(($C_1$-$C_{20}$)hydrocarbyl)$^-$, ($C_1$-$C_{40}$)hydrocarbylC(O)N(H)$^-$, $R^KR^LB^-$, $R^KR^LN^-$, $R^KO^-$, $R^KS^-$, $R^KR^LP^-$, or $R^MR^KR^LSi^-$, where each $R^K$, $R^L$, and $R^M$ independently is hydrogen, ($C_1$-$C_{40}$)hydrocarbyl, or ($C_1$-$C_{40}$)heterohydrocarbyl, or $R^K$ and $R^L$ are taken together to form a ($C_2$-$C_{40}$)hydrocarbylene or ($C_1$-$C_{20}$)heterohydrocarbylene and $R^M$ is as defined above.

In some embodiments, X is a halogen, unsubstituted ($C_1$-$C_{20}$)hydrocarbyl, unsubstituted ($C_1$-$C_{20}$)hydrocarbylC(O)O—, or $R^KR^L$N—, wherein each of $R^K$ and $R^L$ independently is an unsubstituted ($C_1$-$C_{20}$)hydrocarbyl. In some embodiments, each monodentate ligand X is a chlorine atom, ($C_1$-$C_{10}$)hydrocarbyl (e.g., ($C_1$-$C_6$)alkyl or benzyl), unsubstituted ($C_1$-$C_{10}$)hydrocarbylC(O)O—, or $R^KR^L$N—, wherein each of $R^K$ and $R^L$ independently is an unsubstituted ($C_1$-$C_{10}$)hydrocarbyl In further embodiments, X is selected from methyl; ethyl; 1-propyl; 2-propyl; 1-butyl; 2,2-dimethylpropyl; trimethylsilylmethyl; phenyl; benzyl; or chloro. X is methyl; ethyl; 1-propyl; 2-propyl; 1-butyl; 2,2-dimethylpropyl; trimethylsilylmethyl; phenyl; benzyl; and chloro. In one embodiment, n is 2 and at least two X independently are monoanionic monodentate ligands. In a specific embodiment, n is 2 and the two X groups join to form a bidentate ligand. In further embodiments, the bidentate ligand is 2,2-dimethyl-2-silapropane-1,3-diyl or 1,3-butadiene.

In some embodiments, X is a substituted benzyl or heteroarylbenzyl.

In one or more embodiments, X is a bidentate ligand selected from the group consisting of:

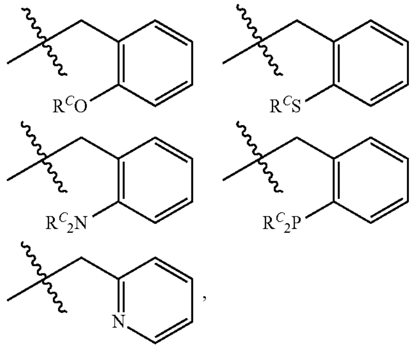
, wherein the heteroatom coordinates to titanium metal via a dative covalent bond.

In one or more embodiments, each X is independently $—(CH_2)SiR^X_3$, in which each $R^X$ is independently a $(C_1-C_{30})$alkyl or a $(C_1-C_{30})$heteroalkyl and at least one $R^X$ is $(C_1-C_{30})$alkyl. In some embodiments, when one of $R^X$ is a $(C_1-C_{30})$heteroalkyl, the heteroatom is silica or oxygen atom. In some embodiments, $R^X$ is methyl, ethyl, propyl, 2-propyl, butyl, 1,1-dimethylethyl (or tert-butyl), pentyl, hexyl, heptyl, n-octyl, tert-octyl, or nonyl.

In one or more embodiments X is $—(CH_2)Si(CH_3)_3$, $—(CH_2)Si(CH_3)_2(CH_2CH_3)$; $—(CH_2)Si(CH_3)(CH_2CH_3)_2$, $—(CH_2)Si(CH_2CH_3)_3$, $—(CH_2)Si(CH_3)_2$(n-butyl), $—(CH_2)Si(CH_3)_2$(n-hexyl), $—(CH_2)Si(CH_3)$(n-Oct)$R^X$, $—(CH_2)Si$(n-Oct)$R^X_2$, $—(CH_2)Si(CH_3)_2$(2-ethylhexyl), $—(CH_2)Si(CH_3)_2$(dodecyl), $—CH_2Si(CH_3)_2CH_2Si(CH_3)_3$ (herein referred to as $—CH_2Si(CH_3)_2CH_2$TMS). Optionally, in some embodiments, the metal-ligand complex according to formula (I), exactly two $R^X$ are covalently linked or exactly three $R^X$ are covalently linked.

In some embodiments, X is $—CH_2Si(R^C)_{3-Q}(OR^C)_Q$, $—Si(R^C)_{3-Q}(OR^C)_Q$, $—OSi(R^C)_{3-Q}(OR^C)_Q$, in which subscript Q is 0, 1, 2 or 3 and each $R^C$ is independently a substituted or unsubstituted $(C_1-C_{30})$hydrocarbyl, or a substituted or unsubstituted $(C_1-C_{30})$heterohydrocarbyl.

In some embodiments, X is chosen from unsaturated $(C_2-C_{50})$hydrocarbon, unsaturated $(C_2-C_{50})$heterohydrocarbon, or saturated $(C_2-C_{50})$heterohydrocarbon. In various embodiments, X is butadiene, cyclopentadiene, or penta-1,3-diene.

In one or more embodiments, olefin polymerization process is a solution polymerization process.

In solution processes for olefin polymerization, generally catalysts and co-catalysts components like scavengers and activators are added as homogeneous solutions. In many solution processes, the solvent is non-aromatic hydrocarbons. The use of homogeneous solutions allows for greater flexibility in process configurations and allows for the use of delivery and storage vessels that do not require internal agitation, which is commonly used for inhomogeneous solutions. Cocatalysts like methylaluminoxane, which can serve as both activators and scavengers in olefin polymerizations, are not typically soluble in non-aromatic hydrocarbons.

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which may be positively charged due to the loss of a monoanionic ligand, such a benzyl or phenyl. Suitable activating co-catalysts for use herein include oligomeric alumoxanes or modified alkyl aluminoxanes.

Polyolefins

The catalytic systems described in the preceding paragraphs are utilized in the polymerization of olefins, primarily ethylene and propylene, to form ethylene-based polymers or propylene-based polymers. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene-based polymers, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mole percent" are disclosed herein as separate embodiments; for example, the ethylene based polymers, homopolymers and/or interpolymers (including copolymers) of ethylene and optionally one or more co-monomers such as α-olefins may comprise at least 60 mole percent monomer units derived from ethylene; at least 70 mole percent monomer units derived from ethylene; at least 80 mole percent monomer units derived from ethylene; or from 50 to 100 mole percent monomer units derived from ethylene; or from 80 to 100 mole percent monomer units derived from ethylene.

In some embodiments, the ethylene-based polymers may comprise at least 90 mole percent units derived from ethylene. All individual values and subranges from at least 90 mole percent are included herein and disclosed herein as separate embodiments. For example, the ethylene based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene-based polymer, the amount of additional α-olefin is less than 50 mol %; other embodiments include at least 1 mole percent (mol %) to 25 mol %; and in further embodiments the amount of additional α-olefin includes at least 5 mol % to 103 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene-based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more co-catalysts, as described in the preceding paragraphs.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene based polymers may further be blended with one or more polymers to form a blend.

In some embodiments, a polymerization process for producing an ethylene-based polymer may include polymerizing ethylene and at least one additional α-olefin in the presence of a catalyst system according to the present disclosure. The polymer resulting from such a catalyst system that incorporates the metal-ligand complex of formula (I) may have a density according to ASTM D792 (incorporated herein by reference in its entirety) from 0.850 g/cm$^3$ to 0.950 g/cm$^3$, from 0.860 g/cm$^3$ to 0.920 g/cm$^3$, from 0.865 g/cm$^3$ to 0.900 g/cm$^3$, from 0.860 g/cm$^3$ to 0.900 g/cm$^3$, 0.860 g/cm$^3$ to 0.890 g/cm$^3$, or 0.865 g/cm$^3$ to 0.890 g/cm$^3$, for example.

In another embodiment, the polymer resulting from the catalyst system according to the present disclosure has a melt flow ratio ($I_{10}/I_2$) from 5 to 15, where the melt index, 12, is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system according to the present disclosure has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

One or more features of the present disclosure are illustrated in view of the examples as follows:

EXAMPLES

Procedure for Batch Reactor Polymerization. Raw materials (ethylene, 1-octene) and the process solvent (a narrow boiling range high-purity isoparaffinic solvent trademarked ISOPAR E commercially available from ExxonMobil Corporation) are purified with molecular sieves before introduction into the reaction environment. A one gallon (3.79 L) stirred autoclave reactor was charged with ISOPAR E, and 1-octene. The reactor was then heated to the desired temperature and charged with ethylene to reach the desired pressure. Hydrogen was also added at this point if desired. The catalyst composition was prepared in a drybox under inert atmosphere by mixing the desired pro-catalyst and optionally one or more additives as desired, with additional solvent to give a total volume of about 15-20 mL. The activated catalyst mixture was then quick-injected into the reactor. The reactor pressure and temperature were kept constant by feeding ethylene during the polymerization and cooling the reactor as needed. After 10 minutes, the ethylene feed was shut off and the solution transferred into a nitrogen-purged resin kettle. The polymer was thoroughly dried in a vacuum oven, and the reactor was thoroughly rinsed with hot ISOPAR E between polymerization runs.

Test Methods

Unless otherwise indicated herein, the following analytical methods are used in describing aspects of the present disclosure:

Melt Index

Melt indices $I_2$ (or I2) and $I_{10}$ (or I10) of polymer samples were measured in accordance to ASTM D-1238 (method B) at 190° C. and at 2.16 kg and 10 kg load, respectively. Their values are reported in g/10 min. Fractions of polymer samples were measured by collecting product polymer from the reactor which produces that specific fraction or portion of the polymer composition. For example, the first polyethylene fraction can be collected from the reactor producing the lower density, higher molecular weight component of the polymer composition. The polymer solution is dried under vacuum before the melt index measurement.

Density

Samples for density measurement were prepared according to ASTM D4703. Measurements were made, according to ASTM D792, Method B, within one hour of sample pressing.

Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQ 1)}$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 Mw.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max}}{\text{Peak Width at } \frac{1}{2} \text{ height}} \right)^2 \quad \text{(EQ 2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ Max} - \text{Front Peak } RV_{one\ tenth\ height})} \quad \text{(EQ 3)}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum^{i} IR_i}{\sum^{i} \left( IR_i / M_{polyethylene_i} \right)} \quad \text{(EQ 4)}$$

$$Mw_{(GPC)} = \frac{\sum^{i} \left( IR_i * M_{polyethylene_i} \right)}{\sum^{i} IR_i} \quad \text{(EQ 5)}$$

$$Mz_{(GPC)} = \frac{\sum^{i} \left( IR_i * M^2_{polyethylene_i} \right)}{\sum^{i} \left( IR_i * M_{polyethylene_i} \right)} \quad \text{(EQ 6)}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +/−0.5% of the nominal flowrate.

$$Flowrate(\text{effective}) = Flowrate(\text{nomial}) * \left( RV(FM \text{ Calibrated}) / RV(FM \text{ Sample}) \right) \quad \text{(EQ 7)}$$

Hydrocarbyl-modified methylaluminoxane (MMAO) are commercially available from Nouryon, office location Chicago, Illinois, USA, and Albemarle, headquarter in Charlotte N.C., USA.

Analysis of the Hydrocarbyl-Modified Methylaluminoxane Activator

In a nitrogen atmosphere glovebox, aluminum-based analyte having the formula $AlR^{A1}R^{B1}R^{C1}$ was transferred to a tared bottle and the mass of the sample was recorded. The sample was diluted with methylcyclohexane and then quenched with methanol. The mixture was swirled and allowed to react over 15 minutes prior to removal of the sample from the glovebox. The sample was further hydrolyzed by addition of $H_2SO_4$. The bottle was capped shaken for five minutes. Periodic venting of the bottle may be necessary depending on aluminum concentration. The solution was transferred to a separatory funnel. The bottle was rinsed repeatedly with water adding each rinseate from this process to the separatory funnel. The organic layer was discarded and the remaining aqueous solution was transferred to a volumetric flask. The separatory funnel was further rinsed with water, each rinseate being added to the volumetric flask. The flask was diluted to a known volume, thoroughly mixed, and analyzed by complexation with excess EDTA and subsequent back-titration with $ZnCl_2$ using xylenol orange as an indicator.

Calculation of the $AlR^{A1}R^{B1}R^{C1}$ Compound in the Hydrocarbyl-Modified Methylaluminoxane $$\text{Molarity Al in titrant} = \frac{[(M\,\text{EDTA} * \text{mL EDTA}) - (M\ \text{ZnCl}_2 * \text{mL ZnCl}_2)]}{\text{mL, aqueous solution used in titrated}} \quad \text{(EQ. 8)}$$

$$\text{mole \% Al in sample} = \frac{(\text{Molarity Al in titrant} * \text{Volume of Volumetric Dilution}) * 26.98\frac{\text{g}}{\text{mol Al}}}{\text{Mass of Analyte sample}} * 100 \quad \text{(EQ. 9)}$$

The $AlR^{A1}R^{B1}R^{C1}$ Compound content is analyzed using previously described methods (*Macromol. Chem. Phys.* 1996, 197, 1537; WO2009029857A1; *Analytical Chemistry* 1968, 40 (14), 2150-2153; and *Organometallics* 2013, 32(11), 3354-3362)

The metal-complexes are conveniently prepared by standard metallation and ligand exchange procedures involving a source of transition metal and a neutral polyfunctional ligand source. In addition, the complexes may also be prepared by means of an amide elimination and hydrocarbylation process starting from the corresponding transition metal tetraamide and a hydrocarbylating agent, such as trimethylaluminum. The techniques employed are the same as of analogous to those disclosed in U.S. Pat. Nos. 6,320, 005, 6,103,657, WO 02/38628, WO 03/40195, US-A-2004/ 0220050.

The general synthesis for CGC catalysts may be found in U.S. Pat. No. 6,884,857B1. The procedure for the synthesis of Complex A is found in U.S. Pat. No. 5,470,993 A; the procedure for the synthesis of Complex B is found in U.S. Pat. No. 5,965,756 A; the procedure for the synthesis of Complex C is found in PCT Application No. WO 1998/ 006726 A1; the procedure for the synthesis of Complex D is found in U.S. Pat. No. 6,268,444; the procedure for the synthesis of Complex E is found in PCT Application No. WO 2001/042315 A1.

Suitable cocatalysts include those compounds previously known in the art for use with Group 4 metal olefin polymerization complexes. Examples of suitable activating cocatalysts include neutral Lewis acids, such as $(C_1\text{-}C_{30})$hydrocarbyl substituted Group 13 compounds, especially tri (hydrocarbyl)aluminum or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluorophenyl)borane; nonpolymeric, compatible, noncoordinating, ion forming compounds (including the use of such compound under oxidizing conditions), especially the use of ammonium-, phosphonium-, oxonium-, carbonium-, silylium-, or sulfonium-salts of compatible noncoordinating anions, or ferrocenium-, lead-, or silver-salts of compatible, noncoordinating anions; and combinations of the foregoing cation forming cocatalysts and techniques. The foregoing activating cocatalysts and activating techniques have been previously taught with respect to different metal complexes for olefin polymerizations in the following references: EP-A-277,003, U.S. Pat. Nos.

5,153,157, 5,064,802, 5,321,106, 5,721,185, 5,350,723, 5,425,872, 5,625,087, 5,883,204, 5,919,983, 5,783,512, WO 99/15534, and WO99/42467.

Procatalysts A, B, C, D, and E have a structure according to formula (I) and are as follows:

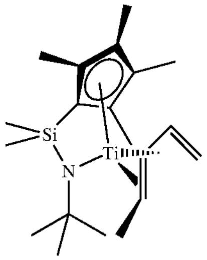

Procatalyst A

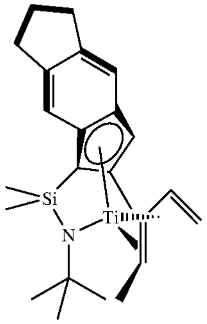

Procatalyst B

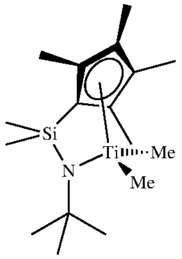

Procatalyst C

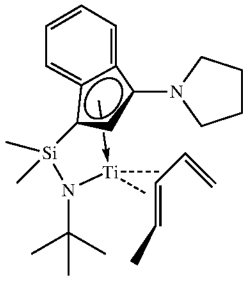

Procatalyst D

-continued

Procatalyst E

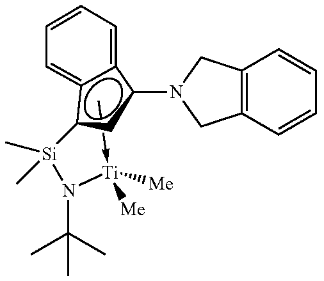

Comparative Co-catalyst C1

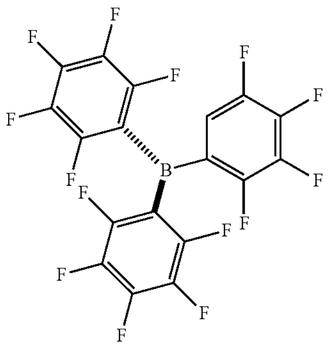

-continued

Comparative Co-catalyst C2

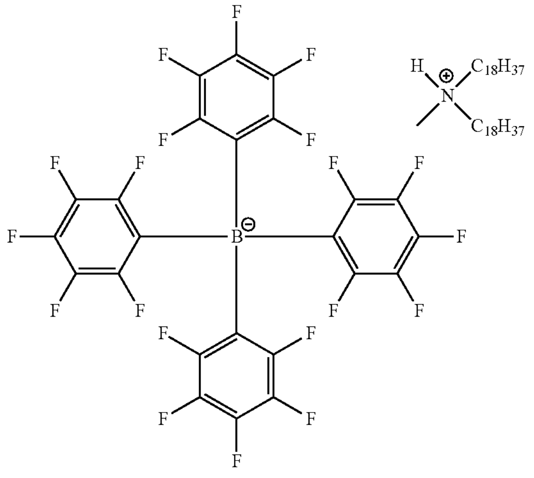

TABLE 1

Alkyl Aluminoxane Co-catalyst Compositions

| Name | Solvent | Methane (mol %) | Isobutane (mol %) | Aluminum (mol %) | Active Aluminum as $AlR^{A1}R^{B1}R^{C1}$ (%) |
|---|---|---|---|---|---|
| C3 | Heptane | 67.1 | 32.3 | 7.0 | 29 |
| C4 | Heptane | 66.6 | 31.5 | 6.8 | 41 |
| I1 | Isopar E | | | 6.76 | 11 |

Co-Catalyst $C_3$ and $C_4$ a hydrocarbyl-modified methylaluminoxane(MMAO) containing a combination of isobutyl and methyl groups in approximately a 1:2 ratio.

Co-Catalyst I1 is a modified methylaluminoxane (MMAO) containing a combination of octyl and methyl groups in approximately a 1:6 ratio, Example 1 Batch Reactor Polymerization Reactions with CGC procatalysts and Comparative Activators and modified aluminoxanes.

Procatalysts A and B were tested in the batch reactor using C1, C2, C3 or C4 as the activator, and the data are summarized in Tables 1-2. The dry weight efficiencies are higher when the catalyst was activated with Inventive Co-Catalyst I1 in comparison to Comparative Activator C1 or Comparative Activator C3.

TABLE 1

Batch Reactor Polymerization data of Complexes A and B using Comparative Co-Catalysts C1, C2, and C3 and I1.

| Complex | Activator | Act:Ti | Yield (g) | Efficiency (g Poly/g Ti) | $T_c$ (° C.) | $T_m$ (° C.) | Mn (g/mol) | Mw (g/mol) | PDI |
|---|---|---|---|---|---|---|---|---|---|
| A | C1[a] | 1.2 | 16.5 | 7926 | 94.51 | 102.87 | 53778 | 272319 | 5.064 |
| A | C2[a] | 1.2 | 27 | 375940 | 94.32 | 105.55 | 18973 | 56117 | 2.958 |
| A | C3 | 100 | 10.5 | 14620 | 95.68 | 103.06 | 38140 | 341843 | 8.963 |
| A | C3 | 501 | 17 | 23670 | 98.44 | 108.1 | 13146 | 85560 | 6.508 |
| A | I1 | 100 | 44 | 61264 | 92.56 | 103.02 | 63018 | 334384 | 5.306 |
| A | I1 | 501 | 50 | 261069 | 93.25 | 105.92 | 32179 | 120831 | 3.755 |
| B | C1[a] | 4 | 26 | 20414 | 85.12 | 93.49 | 54538 | 181841 | 3.334 |
| B | C2[a] | 1.2 | 26.5 | 885547 | 83.45 | 94.8 | 48667 | 125672 | 2.582 |
| B | C3 | 100 | 37 | 11621 | | | | | |
| B | C3 | 500 | 77 | 60458 | 87.79 | 97.7 | 39877 | 174910 | 4.386 |
| B | I1 | 100 | 68 | 284043 | 82.58 | 93.52 | 90055 | 241896 | 2.686 |
| B | I1 | 500 | 180 | 1002506 | 78.83 | 95.33 | 57407 | 138034 | 2.404 |
| B | C1[a] | 4 | 16 | 22278 | 90.37 | 92.99 | 62265 | 158411 | 2.544 |

Run Conditions: 120° C., ISOPAR E (1470 g), 1-octene (100 g). hydrogen (40 mmol), and pressurized with ethylene to a total pressure of 410 psi. [a]This run was conducted with the addition of C3 in a Al:Ti ratio of 50.

The catalyst to activator molar ratio between the comparative co-catalyst $C_1$ is 1.2 and 4 for comparative cocatalyst. For each inventive example, the molar ratio of activator to catalyst is 100 or 500. The inventive catalyst systems contain aluminoxane having straight chain modifying alkyls and a low mole % of $AlR^{A1}R^{B1}R^{C1}$ content. I1 showed an increase efficiency when used to activate constrained geometry catalysts in comparison to borane activator, C1, or aluminoxane systems that have branched alkyls and high mol % of $AlR^{A1}R^{B1}R^{C1}$ content (such as C3). At higher aluminum loadings, I1 also provides better activity than borate activator C2. Overall, the catalyst activity is increased and molecular weight distribution is narrowed using these aluminoxanes.

MTRP-0042-XX). Hydrocarbon solvents (n-pentane, n-hexane, 1-hexene, methyleyclohexane, and toluene) were dried using activated alumina columns according to the method described by Grubbs (see Pangborn, A. B.; Giardello, M. A.; Grubbs, R. H.; Rosen, R. K.; Timmers, F. J., Safe and Convenient Procedure for Solvent Purification. *Organometallics* 1996, 15 (5), 1518-1520) and were then vacuum-transferred from Na/K alloy. Benzene-d6 and toluene-d8 (Cambridge Isotope Laboratories, 99+ atom % D) were stored over Na/K alloy in vacuum and vacuum-transferred immediately prior to use. 1,2-Difluorobenzene and chlorobenzene-d5 were dried with $CaH_2$, distilled under vacuum. Chloroform-d3 and 1,1,2,2-tetrachloroethane-d2 were used as received (Cambridge Isotope Laboratories, 99+ atom % D).

Equipment Standards

All solvents and reagents are obtained from commercial sources and used as received unless otherwise noted. Anhy-

TABLE 2

Batch Reactor Polymerization data of Procatalyst using Comparative Co-Catalysts C1 C2, and C3 and I1.

| Complex | Complex Loading (μmols) | Act. | Act:Ti | C2 Uptake (g) | Yield (g) | Efficiency (g Poly/g Ti) | Mn | Mw | PDI | Density |
|---|---|---|---|---|---|---|---|---|---|---|
| A | 2.25 | C2[a] | 1.2 | 11.0 | 14.8 | 137380 | 6175 | 113905 | 3.36 | 0.876 |
| A | 15 | C4 | 100 | 2.0 | — | — | — | — | — | — |
| A | 15 | C4 | 500 | 4.0 | — | — | — | — | — | — |
| A | 5 | I1 | 100 | 11.5 | 28.3 | 118212 | 77116 | 471800 | 3.00 | 0.866 |
| A | 2.25 | I1 | 500 | 21.6 | 61.1 | 567159 | 26291 | 110364 | 2.31 | 0.864 |
| B | 7.5 | C1[a] | 4 | 1.1 | — | — | — | — | — | — |
| B | 2.5 | C2[a] | 1.2 | 9.3 | 20.4 | 170426 | 14921 | 50824 | 2.08 | 0.860 |
| B | 10 | C4 | 100 | 1.5 | — | — | — | — | — | — |
| B | 10 | C4 | 500 | 4.0 | — | — | — | — | — | — |
| B | 5 | I1 | 100 | 8.2 | 19.3 | 80618 | 26365 | 102571 | 2.18 | 0.857 |
| B | 5 | I1 | 500 | 15.0 | 36.5 | 152464 | 24149 | 96816 | 2.28 | 0.859 |
| C | 5 | C1[a] | 4 | 1.4 | — | — | — | — | — | — |
| C[b] | 5 | C2[a] | 1.2 | 10.4 | 15.7 | 65581 | 6333 | 78978 | 2.47 | 0.872 |
| C | 7.5 | C4 | 100 | 2.5 | — | — | — | — | — | — |
| C | 7.5 | C4 | 500 | 2.3 | — | — | — | — | — | — |
| C | 10 | I1 | 100 | 11.6 | 26.7 | 55764 | 8932 | 64208 | 2.39 | 0.864 |
| C | 10 | I1 | 500 | 13.2 | 29.4 | 61404 | 8732 | 62039 | 2.43 | 0.857 |
| D | 7.5 | C1[a] | 4 | 2.0 | — | — | — | — | — | — |
| D | 0.44 | C2[a] | 1.2 | 14.5 | 22 | 1050245 | 21438 | 117689 | 3.23 | 0.882 |
| D | 5 | C4 | 100 | 2.9 | — | — | — | — | — | — |
| D | 5 | C4 | 500 | 4.1 | — | — | — | — | — | — |
| D | 4 | I1 | 100 | 19.9 | 29.8 | 155597 | 53186 | 217687 | 2.27 | 0.890 |
| D | 5 | I1 | 500 | 10.6 | 12.2 | 50961 | 36385 | 203562 | 2.77 | 0.900 |
| E | 7.5 | C1[a] | 4 | 1.6 | — | — | — | — | — | — |
| E | 0.8 | C2[a] | 1.2 | 20.6 | 37.8 | 986842 | 20810 | 86109 | 2.43 | 0.872 |
| E | 2.6 | C4 | 100 | 1.6 | — | — | — | — | — | — |
| E | 2.6 | C4 | 500 | 2.7 | — | — | — | — | — | — |
| E | 3.75 | I1 | 100 | 16.0 | 60 | 334169 | 63698 | 934630 | 4.80 | 0.868 |
| E | 5 | Il | 500 | 8.9 | 12.3 | 51378 | 29360 | 172251 | 2.69 | 0.887 |

Run Conditions: 120° C., ISOPAR E (1470 g), 1-octene (150 g). hydrogen (40 mmol), pressurized with ethylene to a total pressure of 150 psi. [a]This run was conducted with the addition of C3 in a Al:Ti ratio of 50. b Run modified using with ethylene (175 psi).

All manipulations of air-sensitive materials were performed with rigorous exclusion of $O_2$ and moisture in oven-dried Schlenk-type glassware on a dual manifold Schlenk line, interfaced to a high-vacuum line ($10^{-6}$ Torr), or in a $N_2$-filled MBraun glove box with a high-capacity recirculator (less than 1 ppm $O_2$). Argon (Airgas, pre-purified grade) was purified by passage through a supported MnO oxygen-removal column and an activated Davison 4 Å molecular sieve column. Ethylene (Airgas) was purified by passage through an oxygen/moisture trap (Matheson, model drous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 μm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 μm 2.1×50 mm column coupled with an Agilent 6230 TOF Mass Spectrometer with electrospray ionization. $^{1}H$ NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^{1}H$ NMR data are reported in ppm downfield from internal tetramethylsilane (TMS, δ scale) using residual protons in the deuterated solvent as references. $^{13}C$ NMR data are determined with $^{1}H$ decoupling, and the chemical shifts are reported downfield from tetramethylsilane (TMS, δ scale) in ppm versus the using residual carbons in the deuterated solvent as references.

The invention claimed is:

1. A process of polymerizing olefin monomers, the process comprising reacting ethylene and optionally one or more olefin monomers in the presence of a catalyst system, wherein the catalyst system comprises:

hydrocarbyl-modified methylaluminoxane having less than 25 mole percent trihydrocarbyl aluminum compounds $AlR^{A1}R^{B1}R^{C1}$ based on total moles of aluminum in the hydrocarbyl-modified methylaluminoxane, where $R^{A1}$, $R^{B1}$, and $R^{C1}$ are independently linear $(C_1\text{-}C_{40})$alkyl or branched $(C_1\text{-}C_{40})$alkyl; and one or more procatalysts comprising a metal-ligand complex according to formula (I):

(I)

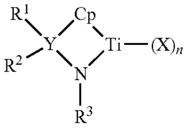

where:

Ti is titanium;

n is 1, 2, or 3;

each X is a monodentate ligand or bidentate ligand independently chosen from unsaturated $(C_2\text{-}C_{50})$hydrocarbon, unsaturated $(C_2\text{-}C_{50})$heterohydrocarbon, saturated $(C_2\text{-}C_{50})$heterohydrocarbon, $(C_1\text{-}C_{50})$hydrocarbyl, $(C_6\text{-}C_{50})$aryl, $(C_6\text{-}C_{50})$heteroaryl, cyclopentadienyl, substituted cyclopentadienyl, $(C_4\text{-}C_{12})$diene, halogen, and —$NCOR^{C}$;

each $R^{c}$ is independently substituted $(C_1\text{-}C_{30})$hydrocarbyl, unsubstituted $(C_1\text{-}C_{30})$hydrocarbyl, substituted $(C_1\text{-}C_{30})$heterohydrocarbyl, or unsubstituted $(C_1\text{-}C_{30})$heterohydrocarbyl;

the metal-ligand complex is overall charge-neutral;

Cp is selected from the group consisting of cyclopentadienyl and $R^{S}$ substituted cyclopentadienyl, the Cp being bound in an $\eta^5$ bonding mode to Ti, wherein $R^{S}$ is independently selected from the group consisting of $(C_1\text{-}C_{20})$alkyl, $(C_1\text{-}C_{20})$heteroalkyl, $(C_1\text{-}C_{20})$aryl, or $R^{S}$ substituent $(C_1\text{-}C_{20})$aryl, $(C_1\text{-}C_{20})$heteroaryl, or $R^{S}$ substituent $(C_1\text{-}C_{20})$heteroaryl, wherein two adjacent $R^{S}$ groups are optionally linked to form a ring;

N is nitrogen;

Y is carbon or silicon and is covalently bonded to Cp; and $R^1$ and $R^2$ are independently selected from —H, $(C_1\text{-}C_{40})$hydrocarbyl, and $(C_1\text{-}C_{40})$heterohydrocarbyl;

$R^3$ is selected from $(C_1\text{-}C_{40})$hydrocarbyl or $(C_1\text{-}C_{40})$heterohydrocarbyl;

$R^{A1}$, $R^{B1}$, and $R^{C1}$ are methyl, ethyl, propyl, 2-propyl, butyl, n-octyl, nonyl, decyl, undecyl, or dodecyl; and at least one of $R^{A1}$, $R^{B1}$, and $R^{C1}$ is different from the other $R^{A1}$, $R^{B1}$, and $R^{C1}$.

2. The process of polymerizing olefin monomers according to claim 1, where the hydrocarbyl-modified methylaluminoxane has less than 20 mole percent of trihydrocarbyl aluminum compounds based on the total moles of aluminum in the hydrocarbyl-modified methylaluminoxane.

3. The process of polymerizing olefin monomers according to claim 1, where the hydrocarbyl-modified methylaluminoxane has less than 15 mole percent of trihydrocarbyl aluminum compounds based on the total moles of aluminum in the hydrocarbyl-modified methylaluminoxane.

4. The process of polymerizing olefin monomers according to claim 1, where the hydrocarbyl-modified methylaluminoxane has less than 10 mole percent of trihydrocarbyl aluminum compounds based on the total moles of aluminum in the hydrocarbyl-modified methylaluminoxane.

5. The process of polymerizing olefin monomers according to claim 1, wherein the catalyst system does not contain a borate activator.

6. The process of polymerizing olefin monomers according to claim 1, wherein the one or more olefin monomers is $(C_3\text{-}C_{20})\alpha$-olefin.

7. The process of polymerizing olefin monomers according to claim 1, wherein the one or more olefin monomers is not $(C_3\text{-}C_{20})\alpha$-olefin.

8. The process of polymerizing olefin monomers according to claim 1, wherein the one or more olefin monomers is cyclic olefin.

9. The process of polymerizing olefin monomers according to claim 1, wherein $R^1$ and $R^2$ are independently $(C_1\text{-}C_{12})$alkyl or $(C_6\text{-}C_{20})$aryl.

10. The process of polymerizing olefin monomers according to claim 1, wherein $R^1$ and $R^2$ are methyl, ethyl, propyl, or phenyl.

11. The process of polymerizing olefin monomers according to claim 1, wherein $R^3$ is $(C_1\text{-}C_{12})$alkyl.

12. The process of polymerizing olefin monomers according to claim 1, wherein $R^3$ is tert-butyl, tert-octyl, or n-octyl.

13. The process of polymerizing olefin monomers according to claim 1, wherein Cp is tetramethylcyclopentadienyl.

14. The process of polymerizing olefin monomers according to claim 1, wherein Cp is selected from:

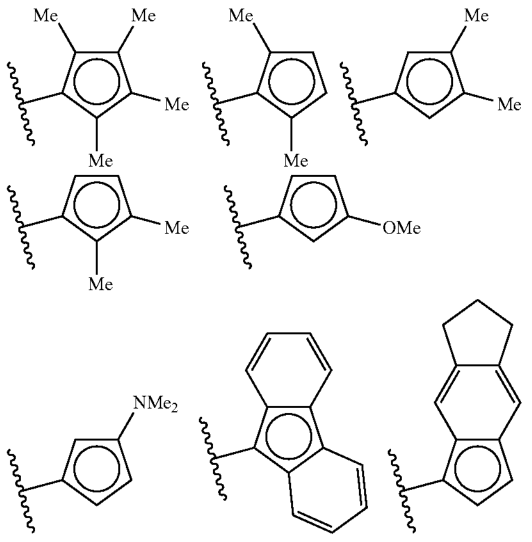

-continued

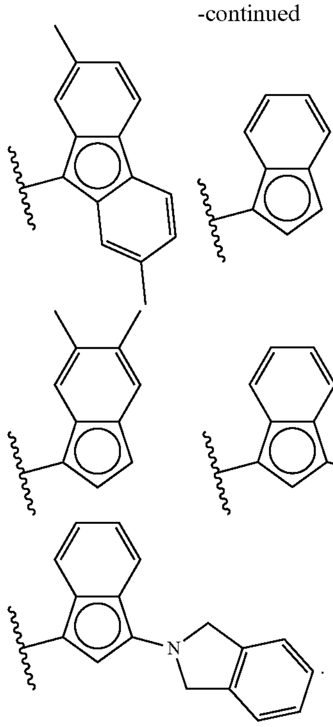

15. The process of polymerizing olefin monomers according to claim 1, wherein the process is a solution polymerization reaction.

16. The process of polymerizing olefin monomers according to claim 1, wherein $R^{A1}$, $R^{B1}$, and $R^{C1}$ comprise methyl and at least another one of ethyl, propyl, 2-propyl, butyl, n-octyl, nonyl, decyl, undecyl, or dodecyl.

17. The process of polymerizing olefin monomers according to claim 1, the hydrocarbyl-modified methylaluminoxane has at greater than or equal to 2.5 mole percent trihydrocarbyl aluminum compounds $AlR^{A1}R^{B1}R^{C1}$ based on total moles of aluminum in the hydrocarbyl-modified methylaluminoxane.

18. A process of polymerizing olefin monomers, the process comprising reacting ethylene and optionally one or more olefin monomers in the presence of a catalyst system, wherein the catalyst system comprises:

hydrocarbyl-modified methylaluminoxane having less than 25 mole percent trihydrocarbyl aluminum compounds $AlR^{A1}R^{B1}R^{C1}$ based on total moles of aluminum in the hydrocarbyl-modified methylaluminoxane, where $R^{A1}$, $R^{B1}$, and $R^{C1}$ are independently linear $(C_1\text{-}C_{40})$alkyl, branched $(C_1\text{-}C_{40})$alkyl, or $(C_6\text{-}C_{40})$aryl; and one or more procatalysts comprising a metal-ligand complex according to formula (I):

(I)

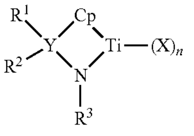

where:

Ti is titanium;

n is 1, 2, or 3;

each X is substituted cyclopentadienyl;

the metal-ligand complex is overall charge-neutral;

Cp is selected from the group consisting of cyclopentadienyl and $R^S$ substituted cyclopentadienyl, the Cp being bound in an $\eta^5$ bonding mode to Ti, wherein $R^S$ is independently selected from the group consisting of $(C_1\text{-}C_{20})$alkyl, $(C_1\text{-}C_{20})$heteroalkyl, $(C_1\text{-}C_{20})$aryl, or $R^S$ substituent $(C_1\text{-}C_{20})$aryl, $(C_1\text{-}C_{20})$heteroaryl, or $R^S$ substituent $(C_1\text{-}C_{20})$heteroaryl, wherein two adjacent $R^S$ groups are optionally linked to form a ring;

N is nitrogen;

Y is carbon or silicon and is covalently bonded to Cp; and $R^1$ and $R^2$ are independently selected from —H, $(C_1\text{-}C_{40})$hydrocarbyl, and $(C_1\text{-}C_{40})$heterohydrocarbyl;

$R^3$ are independently selected from $(C_1\text{-}C_{40})$hydrocarbyl, and $(C_1\text{-}C_{40})$heterohydrocarbyl.

19. The process of polymerizing olefin monomers according to claim 16, wherein Cp is selected from:

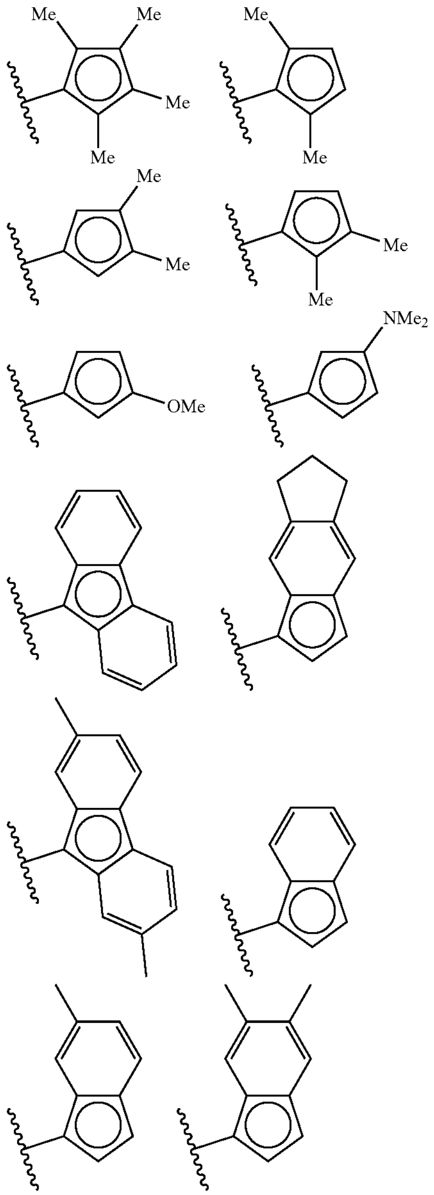

-continued
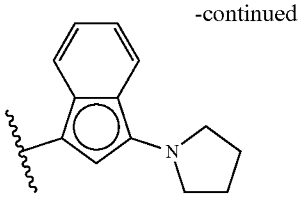
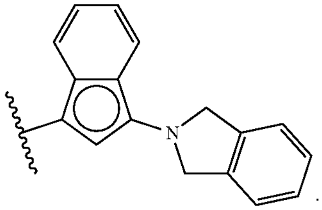
.
* * * * *